United States Patent [19]
Finelli et al.

[11] 3,840,425
[45] Oct. 8, 1974

[54] RETICULATED FIRE PROTECTING STRUCTURE

[75] Inventors: Thomas M. Finelli, North Andover; Sidney Halpert; Julian H. Newland, both of Andover, all of Mass.

[73] Assignee: Avco Corporation, Cincinnati, Ohio

[22] Filed: Mar. 31, 1972

[21] Appl. No.: 240,176

[52] U.S. Cl. .................. 161/68, 156/145, 156/197, 117/137, 161/122, 161/127, 161/139, 161/403
[51] Int. Cl. ............................................. B32b 3/12
[58] Field of Search ............. 161/68, 122, 127, 139, 161/403; 156/145, 197; 117/136

[56] References Cited
UNITED STATES PATENTS
2,684,953   7/1954   Stilbert et al. .................... 260/17.3
3,106,503   10/1963  Randall et al. .................... 161/68 X
3,600,249   8/1971   Jackson et al. .................... 156/197

Primary Examiner—George F. Lesmes
Assistant Examiner—Patricia C. Ives
Attorney, Agent, or Firm—Abraham Ogman, Esq.; Charles M. Hogan, Esq.

[57]  ABSTRACT

The invention covers a reticulated fire protecting structure which is formed partially or fully from a composite material that expands on heating to close the openings of the reticulated structure.

3 Claims, 6 Drawing Figures

PATENTED OCT 8 1974 3,840,425
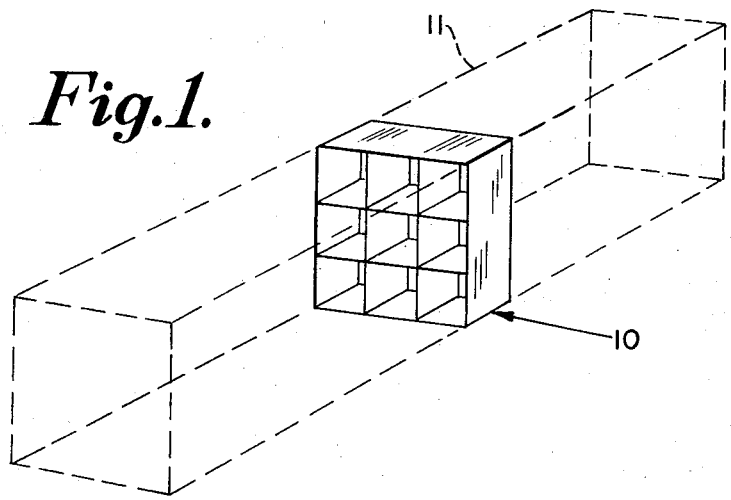
*Fig.1.*
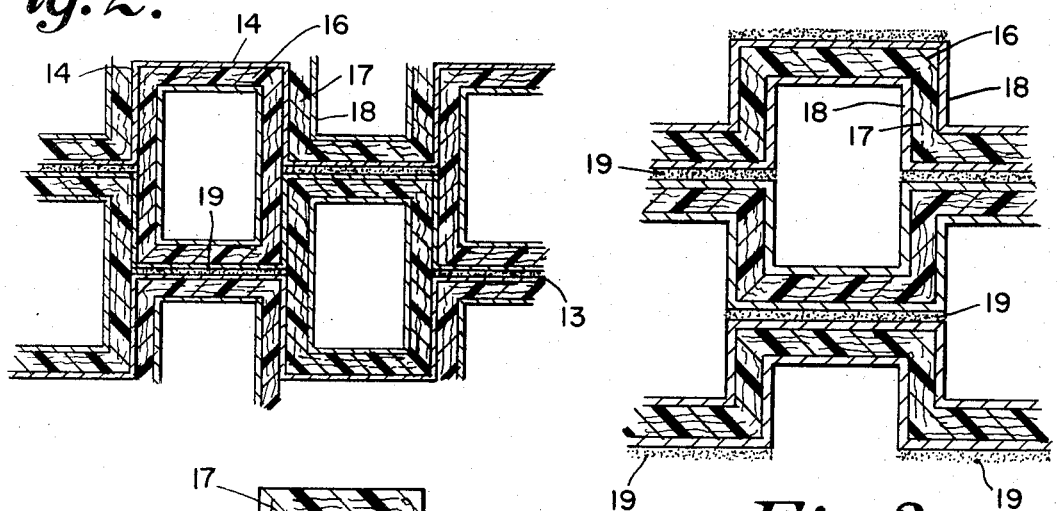
*Fig.2.*
*Fig.3.*
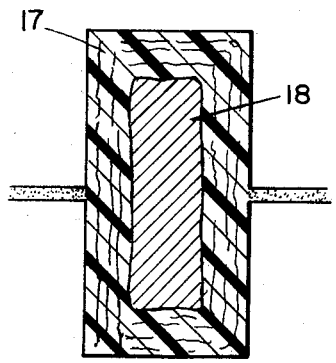
*Fig.4.*
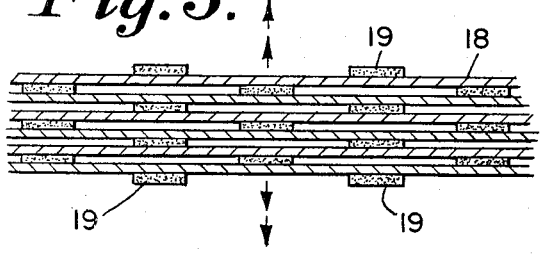
*Fig.5.*
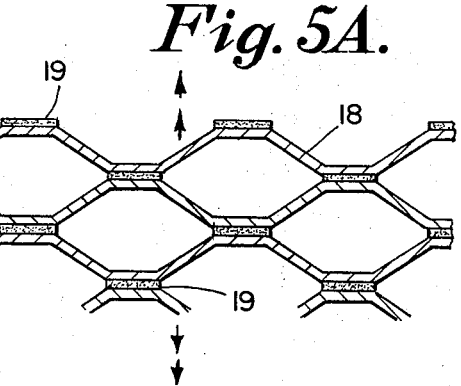
*Fig.5A.*

RETICULATED FIRE PROTECTING STRUCTURE

The invention is directed primarily to a structure for closing off vent passages when heated, as in the case of a hostile fire. A previous means for reaching this objective was to place within the vent a honeycomb structure coated with an intumescent material. This type of configuration limited the use of very small openings since intumescent coatings have a limited expansion per unit thickness since intumescent coatings are very expensive. An economically viable structure of this type could only justify a small amount of intumescent in order of 5 mils thickness.

It is an object of the invention to provide a reticulated fire protecting structure which:

1. avoids limitations and disadvantages of such prior structures;
2. utilizes a composite material which closes the openings of the structure on the application of heat by means of a structural expansion and an intumescent action;
3. utilizes a composite that greatly reduces the cost of such a structure while making such a structure more efficient in resisting the spread of fires;
4. utilizes a compressed fire protecting material as the wall structure of the duct;
5. is adaptable to include fire protecting by means of ablation or through the use of retardants; and
6. comprises a structure that can be made in a simple and facile manner.

It is yet another object of the invention to provide a method of making a reticulated fire protecting structure.

The invention comprises a reticulated fire protecting structure where the walls of the reticulated structure defining the openings thereof are in turn defined by a fire protecting composite material formed from a compressed material which expands when heated and which is coated with an intumescent material.

The invention also covers a method for making the reticulated fire protecting structure using a composite material and conventional techniques for making honeycomb structures.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a schematic representation of a reticulated structure situated within a duct or a vent;

FIG. 2 is a sectional representation of a portion of one embodiment of a fire protecting reticulated material;

FIG. 3 is a sectional representation of a second embodiment wherein the reticulated structure is formed entirely from the fire protecting material;

FIG. 4 is a schematic representation of a typical opening after the material has been heated and expanded to close the opening; and FIG. 5 is a representation used in describing a preferred method of making the reticulated fire protecting structure using honeycomb manufacturing techniques.

FIG. 5A is the FIG. 5 structure partially expanded.

Referring to FIG. 1 of the drawings, there is shown schematically a reticulated structure 10 situated within a vent or duct 11 shown in phantom. It is clear from the drawing that the reticulated structure 10 enables air or other fluids to pass in either direction in the duct 11.

Referring to FIG. 2, the specific embodiment shown therein includes a honeycomb structure 13 made from a metal, fiberglass or other fire resistant material. The wall 14 of each metal opening are covered with a composite fire protecting material 16. A detailed description of the composite 16 is provided in the patent application entitled, "A Fire Protection Material," Ser. No. 240,102, now U.S. Pat. No. 3,816,226, filed simultaneously with this application and assigned to the same Assignee.

Briefly, however, the composite comprises, for example, a compressible material such as a cellular material or a felt material such as fiberglass 17 which has been reversibly compressed to a thickness which is a small fraction of its normal expanded thickness. The felt 17 is held in the compressed configuration by means of a bond or matrix. The chemical or mechanical bond or matrix is chosen so that at a relatively low temperature, such as 200°–400°F, it will melt and decompose and allow the felt 17 to return to its normal expanded configuration, such as shown at 17 in FIG. 4. Wax is the preferred bond or matrix with a thermoplastic resin system that melts in the 200°–400°F range and woods metal as suitable alternatives.

Returning to FIG. 2, the composite 16 also includes an intumescent coating 18 on the surface of the compressed felt 17. At some predetermined temperature at, below or above the melting temperature of the resin, the intumescent coating 18 is triggered and expands as illustrated at 18 in FIG. 4. The combined expansion of the compressed felt and the intumescent coating completely closes the opening. See FIG. 4. Specific configurations of the composite 16 other than that described above are described in the co-pending application previously identified.

Referring to FIG. 3 of the drawings, there is shown a representative number of cell structures in which the cell walls are formed entirely from the fire protecting composite 16. In this case, the intumescent material 18 coats two surfaces of the compressed felt 17.

The FIG. 3 configuration also is beneficial from the point of view that it may be constructed directly using standard honeycomb manufacturing techniques. Briefly, this technique comprises laying up a number of sheets or strips of the compressed material. An adhesive is applied between adjacent sheets and staggered as shown in 19 in FIG. 5. The honeycomb is then formed by applying a force in the direction of the arrows in FIG. 5 from the honeycomb structure.

Where the openings of the reticulated structure are relatively small, no dimension being greater than two times the expanded thickness of the felt, it may be possible to dispense with the intumescent coating.

In general, particularly in ducts where the fluid flow, air or liquid, rates and pressures are relatively high, the reticulated structure and composite material should be designed so that the expanded felt seals as much of the cross sectional area as possible. The strength of the felt is significantly greater than known intumescent chars. Preferably the intumescent char should act as a seal for the felt in the relatively high pressure applications.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. A reticulated fire protecting structure comprising:

a wall structure defining empty cell openings of said reticulated structure; and
   said wall structure being formed from a normally compressible material selected from a felt or a cellular material which has been physically compressed in thickness and held in a compressed state by a heat releasable chemical or mechanical bond, said material physically expanding to its normal thickness when released by heat to substantially fill the normally open cells and having an intumescent coating thereon.

2. A fire protecting structure as defined in claim 1 wherein said walls are formed entirely from the compressed or the composite material.

3. A fire protecting structure as defined in claim 1 wherein said compressed material is bonded to a fire resistant substrate.

* * * * *